(12) United States Patent
Wajs et al.

(10) Patent No.: US 8,595,854 B2
(45) Date of Patent: Nov. 26, 2013

(54) PROCESSING RECORDABLE CONTENT IN A STREAM

(75) Inventors: Andrew Augustine Wajs, Haarlem (NL); Graham Kill, Maizidian (CN)

(73) Assignee: Irdeto B.V. (NL)

( * ) Notice: Subject to any disclaimer, the term of this patent is extended or adjusted under 35 U.S.C. 154(b) by 653 days.

(21) Appl. No.: 12/831,832

(22) Filed: Jul. 7, 2010

(65) Prior Publication Data

US 2011/0010545 A1   Jan. 13, 2011

(30) Foreign Application Priority Data

Jul. 7, 2009   (EP) ..................................... 09164801

(51) Int. Cl.
*G06F 21/00* (2013.01)

(52) U.S. Cl.
USPC .............................. 726/28; 380/277; 380/239

(58) Field of Classification Search
None
See application file for complete search history.

(56) References Cited

U.S. PATENT DOCUMENTS

| | | | |
|---|---|---|---|
| 2002/0188567 A1 | 12/2002 | Candelore | |
| 2005/0182931 A1* | 8/2005 | Robert et al. | 713/168 |
| 2006/0123246 A1 | 6/2006 | Vantalon et al. | |
| 2006/0288424 A1 | 12/2006 | Saito | |
| 2009/0007240 A1 | 1/2009 | Vantalon et al. | |

FOREIGN PATENT DOCUMENTS

FR   2843257 A1   2/2004

OTHER PUBLICATIONS

"European Application No. 09164801.4, European Search Report dated Mar. 30, 2010", 3 pgs.

* cited by examiner

*Primary Examiner* — Gilberto Barron, Jr.
*Assistant Examiner* — Abdulhakim Nobahar
(74) *Attorney, Agent, or Firm* — Hayes Soloway P.C.

(57) ABSTRACT

Methods and a systems are described for processing recordable content in a broadcast stream sent to a receiver, wherein said broadcast stream is protected in accordance with a conditional access system and wherein said receiver is configured for storing and consuming content in said broadcast stream in accordance with a digital rights management system. In this methods and systems recording information is sent in one or more entitlement control messages over a broadcast network to a receiver. Using the recording information in the entitlement control messages the receiver is able to store recordable events in a broadcast stream on a storage medium and to consume said recorded events in accordance with a digital rights management system.

16 Claims, 4 Drawing Sheets

PROCESSING RECORDABLE CONTENT IN A STREAM

Claim of Priority

The present patent application claims priority under 35 U.S.C.119 to European Patent Application (EPO) No.09164801.4, filed Jul.7, 2009, the entire contents of which is incorporated herein by reference.

FIELD OF THE INVENTION

The invention relates to processing recordable content in a stream and, in particular, though not exclusively, to a method and a receiver system for transforming recordable content protected in accordance with a conditional access system into content protected in accordance with a digital rights management system. The invention further relates to a method for decrypting at least part of a recorded event originating from a conditional access system, a digital rights management agent and a conditional access agent for use in such receiver system, a data structure generated by said receiver system and a computer program products using said method.

BACKGROUND OF THE INVENTION

In order to leverage investments content providers constantly develop new types of multimedia services. With the emergence of digital video recording (DVR) and mobile television, one type of such new services regards combining broadcast services with download services. For example a subscriber may obtain a subscription to receive a streamed service and—in addition—to store the streamed service for playback. Such functionality may be implemented using one or more consumer electronic devices e.g. a set-top box for access to a broadcast signal and a (portable) media player, which may be configured to connect to the set-top box for downloading a media file comprising the content.

Broadcast platforms typically use a Conditional Access (CA) system for access control to content in the broadcast stream. In order to scramble the content in the stream, the CA system uses control words (CW) which are periodically updated in order to enhance the security. CA receivers may descramble the scrambled content using so-called entitlement control messages (ECM) which are sent by the CA system along with the scrambled content stream to the CA receivers. An ECM comprises one or more CWs in encrypted form which may be decrypted by the CA receiver using a private key stored in a secure device (e.g. a smart card or the like). The ECMs may further comprise subscriber rights for accessing one or more programs in the scrambled content stream.

On the other hand, personal computers and/or portable media players typically use a digital rights management (DRM) system for access control to content such as DVDs, MPEG files etc. In a DRM system, e.g. the OMA DRM system of the Open Mobile Alliance used in mobile phones or the Windows Media DRM system for access control to paid content, a DRM rights issuer may issue a rights object (i.e. a license comprising the terms and conditions) associated with the use of a single piece of encrypted content, to a device. Such rights object may be delivered to the device separately from the content.

Hence, combining broadcast streaming with download services requires an interface between the different access control systems such that the required level of security may still be ensured. For example one type of interface may be configured for transcoding a CA protected broadcast file into a DRM protected media file. Interfaces between two access control systems, so-called bridges, are known and described for example in WO2009/002643 and EP1564622.

One problem associated with known interfaces is the management of keys used to re-encrypt a CA broadcast under a DRM system and to associate a right object to the content for managing the stored content once it has been transformed into a DRM format. The generation of rights objects within a consumer electronics device, e.g. a set-top box or a portable media player, may pose a significant security risk as access to the keys may allow the creation of right objects for any content that has been distributed. Hence, these DRM keys require high level security processing.

Another problem relates to the requirement that during a broadcast a recording may be started at a random point in time. Hence, at every point in time during a broadcast transmission all information needed for recording and consuming an event should be available to all authorized CA receivers in the system. This information should be provided to these receivers without compromising the bandwidth of the broadcast network.

Yet a further problem relates to the fact that a set-top box may require a connection to different media players supported by different DRM systems while at the same maintaining the required level of security. A bridge should thus be capable of transmitting content to devices having different DRM technology implemented therein (e.g. Windows Media DRM in portable media players and OMA DRM in mobile phones).

Hence, there is a need in the art for improved methods and systems for efficiently and securely processing recordable content in a stream. Further, there is a need in the art for an interface between a CA system and a DRM system which provides a secure key management system and/or enhanced interoperability.

SUMMARY OF THE INVENTION

It is an object of the invention to reduce or eliminate at least one of the drawbacks known in the prior art. In a first aspect, the invention may relate to a method of transforming recordable content protected in accordance with a conditional access system into content protected in accordance with a digital rights management system, wherein the method comprises the steps of: receiving a stream and one or more entitlement control messages associated with said stream, at least one of said entitlement control messages comprising at least one first key for decrypting data in said stream and recording information indicating one or more events in said stream to be recordable; selecting at least one recordable event; decrypting data packets associated with said selected event using said first key; providing a DRM key associated with said digital rights management system; and encrypting at least part of said data packets under said DRM key. In one embodiment said one or more entitlement control messages may comprise at least one content identifier for identifying content in said recordable event and/or said second key information comprising a second key enabling said receiver to generate said DRM key and, optionally, recording subscription information for checking entitlement to store at least one of said recordable events. In another embodiment the method may comprise the step of receiving location information for locating a server associated with said digital rights management system. In yet another embodiment said second key information further comprises a key reference used by said conditional access system to retrieve said second key from a secure database enabling the said conditional access system to generate said DRM key for said receiver if said receiver request decryption of said encrypted recordable event.

By incorporating key information associated with the digital right management system in the entitlement control messages, which are processed by a secure device such as a smart card, and by sending location information of a server associated with the digital rights management system to a CA receiver, a key distribution scheme may be realized which ensures that all sensitive key information needed for encrypting and decrypting recordable events in a broadcast stream is stored and/or generated either in the secure environment of the CA control system or in the secure device, e.g. the smart card, of the CA receiver.

In one embodiment the method may comprise the step of storing said data packets encrypted in accordance with said digital rights management system and said associated recording information on a storage medium, preferably in a media file associated with said digital rights management system. wherein said data packets encrypted under said DRM key are stored together with at least one content identifier, a key index and location information for locating a server associated with said digital rights management system.

In another embodiment, a receiver comprising a conditional access agent configured for communicating with a secure device may be used, wherein the method may further comprise the step of decrypting said entitlement control messages under a secret key in said secure device; upon request of said conditional access agent, the secure device transmitting at least part of the recording information in said entitlement control messages to said conditional access agent.

In another aspect the invention may relate to a method of decrypting of at least part of a recorded content event originating from a conditional access system wherein said stored content event may be protected in accordance with a digital rights management system and wherein the digital rights management system comprises an interface with said conditional access system and wherein said conditional access system is configured for generating a DRM key for decrypting said stored content event. The method may comprise the steps of: selecting at least one content event stored on a storage medium; providing recording information associated with said selected content event, said recording information comprising at least one content identifier for identifying said stored content event and a key reference for enabling said conditional access system to generate at least one DRM key; providing location information associated with at least one server in said digital rights management system; sending said recording information via said server to said conditional access system; receiving at least one DRM key generated by said first access control system; and, decrypting said stored content event for consumption using said DRM key.

Hence, the recording information sent by the entitlement control messages and the location information of the DRM server is stored with the DRM encrypted content in a media file. This method allows secure retrieval of a DRM key required to decrypt a stored event and/or the issuance of right object associated with a stored event in the receiver.

In one embodiment said recording information may be stored with said stored event in media file on said storage medium.

In another aspect the invention may relate to a receiver system for receiving recordable content in a content stream protected in accordance with a conditional access system and for transforming said content into content protected in accordance with a digital rights management system, said content encryption system comprising: an input for receiving said content stream and one or more associated entitlement control messages, at least one of said entitlement control messages comprising a first key and recording information; a recording detector for detecting a recording identifier in said recording information, said recording identifier indicating that one or more events in said broadcast stream are recordable; a selector for selecting at least one of said recordable events identified by said recording detector; a conditional access descrambler for decrypting at least one data packet in said broadcast stream using said first key; a DRM key generator for generating a DRM key; and, a DRM scrambler for encrypting data packets associated with a selected recordable event under said DRM key.

In one embodiment receiver system may further comprise a secure device for decrypting said entitlement control messages under a secure key stored in said secured device.

In another embodiment said recording information may further comprise at least one content identifier for identifying content in said recordable events and/or second key information, said second key information comprising a second key enabling said DRM key generator to generate said DRM key.

In yet another embodiment the system may further comprise a service information client for receiving at least location information for locating at least one server associated with said digital rights management system.

In one variant, the receiver system may comprise a conditional access agent configured for managing the decryption of said entitlement control messages and said content stream in accordance with said conditional access system. In another variant, said conditional access agent may be configured to manage storage of said data packets encrypted by said DRM scrambler in a media file on a storage medium, said media file being stored in accordance with said digital rights management system. In yet another variant, said conditional access agent may be configured for storing a content identifier and location information in said media file, said content identifier identifying the content in said media file and said location information for locating at least one server associated with said digital rights management system. In yet a further variant, the conditional access agent may be configured for enabling a user to select a stored event and in response to said selection to trigger the DRM agent to send a request for at least one DRM key and/or object right associated to said selected event to said server.

In one embodiment a, the receiver system may comprise DRM agent associated with said digital rights management system, said DRM agent being configured to receive and/or request at least one or more DRM keys and/or an object rights from at least one server associated with said digital rights management system and/or a DRM descrambler associated with said digital rights management system, said DRM descrambler being configured to receive one or more DRM keys from said DRM agent and to descramble one or more stored events using said one or more DRM keys.

In a further aspect, the invention may relate to a DRM agent for use in a receiver system as defined in the paragraphs above. The DRM agent may be configured to request at least one or more DRM keys and/or object rights from at least one server associated with said digital rights management system, said request comprising at least a receiver identifier, a content identifier and a location information for locating said server and said agent further being configured to receive at least one or more DRM keys generated by said conditional access system and/or one or more object rights issued by said server.

In another aspect the invention may relate to a conditional access agent for use in a receiver system as defined in the paragraphs above, said agent being configured for selecting one or more recordable events in said content stream and in response to said selection to generate a DRM key using said second key information in said entitlement control messages sent by said conditional access system to said conditional access agent and forwarding said DRM key to a DRM scrambler for enabling said DRM scrambler to encrypt data packets in said selected recordable events.

In one embodiment the agent may be configured for selecting a stored event and in response to said selection to trigger the DRM agent to send a request for at least one DRM key and/or object right associated with said selected event to said server.

In yet another aspect the invention may relate to a data structure generated by a receiver system as described in the paragraphs above, wherein said data structure comprises one or more data packets encrypted under a DRM key associated with a digital rights management system, said data structure further comprising location information and a key reference enabling a receiver accessing said data structure to locate a server in said digital rights management system and to request said conditional access system via said server to generate said DRM key, wherein the key reference refers to a second key in a database, said second key allowing said conditional access system to generate said DRM key.

The invention may also relate to a computer program product comprising software code portions configured for, when run in the memory of a computer, executing the method steps according as defined in the paragraphs above.

The invention may also relate to a method of transmitting content in a stream protected in accordance with a conditional access system to a receiver, wherein said receiver is configured for storing and consuming content in said stream in accordance with a digital rights management system. The method may comprise the steps of: providing at least one recordable event for transmission in a stream to said receiver; generating recording information associated with said recordable event, said recording information comprising at least a recording identifier enabling said receiver to identify recordable data packets associated with said recordable event; generating one or more entitlement control messages associated with said recordable event, said entitlement control messages comprising said recording information and one or more first keys for decrypting data in said broadcast stream; and, transmitting said stream and said one or more entitlement control messages to said receiver. The invention also relates to a content encryption system using such method.

Using recording information, e.g. a recording flag and/or a content ID hash, in the entitlement control messages allows a receiver to be constantly informed (i.e. with a typical repetition rate of an ECM ranging from 200 ms to 500 ms) whether or not data identified by the content ID hash is recordable without compromising the broadcast bandwidth. Further, it allows dynamic changes and quick updates in the recording status of a service or events therein. Moreover, it allows the user of an authorized CA receiver to initiate a recording under the DRM system at a random point in time during a broadcast.

Other aspects of the invention may relate to a service information system, a digital rights management server system for use in a content encryption system as referred to above, data structures generated by said encryption system and receiver system, a data signal embodied in a carrier wave propagating over a transmission line of a computer system and/or a data network connected to a computer system, said data signal comprising data encoding at least part of a computer program product as described above; and to a computer program storage medium readable by a computer system and encoding a computer program product for managing secure access to one or more resources of a computer system as described above.

The invention will be further illustrated with reference to the attached drawings, which schematically will show embodiments according to the invention. It will be understood that the invention is not in any way restricted to these specific embodiments.

DETAILED DESCRIPTION

Figure 1:
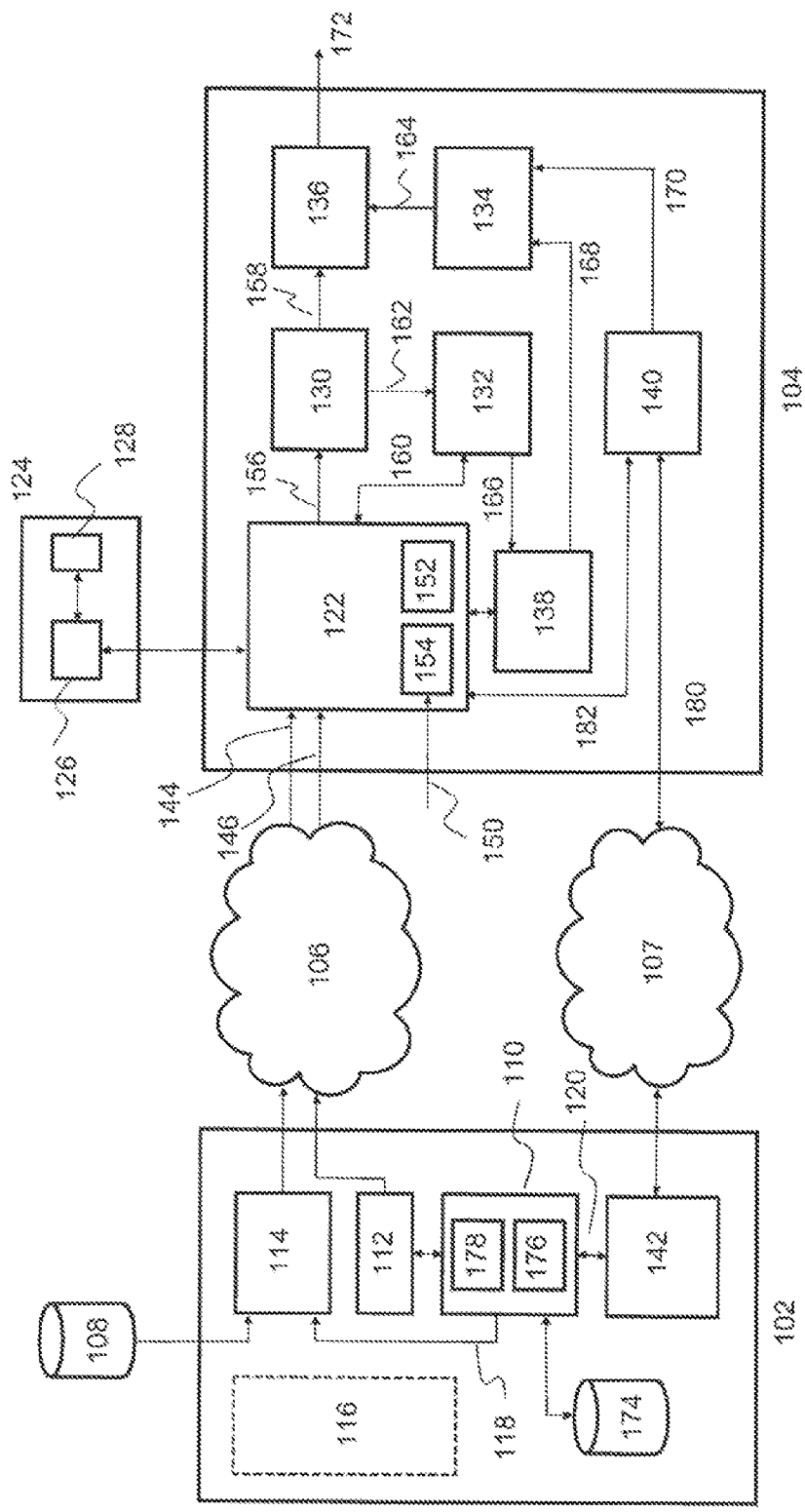
FIG. 1 depicts a schematic of a broadcast system for broadcasting recordable content to receivers having recording and play back functionality according to one embodiment of the invention.

FIG. 1 depicts a schematic representation a broadcast system 100 for broadcasting recordable content to receivers having recording and play back functionality according to one embodiment of the invention. In this embodiment the content is transmitted to the CA receivers using a conditional access (CA) system as a first content protecting system and stored and be played back using a DRM system as second content protection system.

The CA system typically comprises a head-end system 102 and at least one CA receiver 104. The head-end system may be configured to generate a broadcast stream comprising scrambled content and to transmit the broadcast stream via a broadcast network 106 to the CA receiver 104, which are configured to receive and descramble the scrambled broadcast stream.

The head-end system may receive the content from one or more content delivery systems 108, each arranged to deliver one or more services, including e.g. broadcast services and/or other multimedia services such as Video on Demand (VoD). Each service may comprise a number of elementary streams forming a multimedia stream. An elementary stream may comprise e.g. audio, video, subtitles, applets or other data.

The head-end system comprises a CA control system 110 for managing the crypto-system that provides the security for the broadcasted content and an electronic service guide (ESG) system 112 for generating an electronic service guide for allowing the user of the broadcast receivers to select the desired service. Both the CA control system and the ESG system are adapted to provide the desired recording and play back functionality, which will be described hereafter in more detail.

A control word generator (CWG) 176 in the CA control system 110 generates control words CWs and sends the CWs via a connection 118 to the CA scrambler 114 to scramble the content provided by the content delivery system 108. The CWs are also provided to an entitlement control message generator (ECMG) 178 for producing entitlement control messages (ECMs), which are used by the CA system for secure delivery of the CWs to the broadcast receivers. The ECMs further comprise CA access information in order to allow the CA system to check whether a CA receiver is entitled to the CWs for descrambling content in the CA protected broadcast.

In order to allow the CA system to manage recording and play back of an event a discrete content protection system is implemented in the CA system. In one embodiment the discrete content protection system is a DRM-type content protection system comprising a DRM server 142 configured for communicating with the CA control system in the CA system. A DRM agent 140 in the CA receiver is configured communicating with the DRM server via a bi-direction network connection 107. A business information system (BIS) 116 may provide the DRM server and the CA control system information regarding entitlements and rights of subscribers under the CA system and the DRM system.

It is understood that the invention is not limited to the system as depicted in FIG. 1. Many variants exist without departing from the scope of the invention. For example, in one embodiment, the DRM server may be located outside the CA system and/or the DRM agent may be located in a separate DRM-enabled media player which is configured for communicating with an associated CA receiver. Such variant will be described in more detail in FIG. 4 hereunder.

The CA system may interact with the DRM system using a number of parameters. To that end, the ECMG is configured for inserting digital video recording (DVR) information into the ECMs sent to the CA receiver. Hereafter, ECMs comprising DVR information will be referred to as enhanced ECMs.

The DVR information may comprise an indicator whether a piece of content in the transport stream is recordable. Hereafter such recordable piece of content will be referred to as a recordable event. In one embodiment, such indicator is implemented as a recording flag in the header of the ECM. Further, the DVR information may include a DVR content identifier (ID) for establishing a link between the ESG system, the CA system and the DRM system for the same recordable event. Optionally, the DVR may comprise a description of the recordable event. Instead of the DVR content ID itself, in one embodiment, a content ID hash, e.g. a MD5 hash, may be used. Such content an ID hash allows reduction of the bandwidth impact when using large DVR content IDs.

Using such a recording flag and/or a content ID hash the CA receiver will be constantly informed (i.e. with a typical repetition rate of an ECM ranging from 200 ms to 500 ms) whether or not data identified by the content ID hash is recordable without compromising the broadcast bandwidth. Further, it allows dynamic changes and quick updates in the recording status of a service or events therein.

The DVR information may further comprise DVR key information generated by the CA control system. The DVR key information allows the generation of a DRM key used by the DRM system to encrypt and decrypt stored events. The DVR key information may comprise a DVR key formed by a random number generated in the CA control system and stored in a secure key database 174 connected to the CA control system. Both the CA control system and the CA receiver use a common algorithm and the DVR key to calculate the corresponding DRM key. The DVR key information may further comprise a DVR key index. The DVR key identifies the DVR key in the database and is used by the CA system and the DRM system for referencing the DVR keys. The CA control system may store the DVR index and the associated content identifier (e.g. the DVR content ID generated by the ESG) in a database separate from the secure key database (not shown). As will be explained hereunder in more detail with reference to FIG. 2, inserting the DVR information in the ECM, allows the user of an authorized CA receiver to initiate a recording under the DRM system at a random point in time during a broadcast.

The DVR information may further contain DVR subscription information under which broadcast events may be recorded. Events recorded under a specific DVR subscription may only be accessible by a CA device having an appropriate right object.

The CA scrambler 114 scrambles the content using the generated CWs and sends the scrambled content and the associated enhanced ECMs in a transport stream 114, e.g. a MPEG-type transport stream, to one or more CA receivers 104. The transport stream may comprises a sequence of transport stream (TS) packets, each having a header and a payload wherein the payload comprises (scrambled) units of data from a particular elementary stream.

The head-end system may be implemented according to the Simulcrypt standard for Digital Video Broadcast as described in detail in ETSI TS 103.197 V1.4.1 of March 2007. Although the head-end is typically employed to transmit transport stream (TS) packets in accordance with the MPEG-2 standards (International Standard ISO/IEC 13818-1) via a terrestrial, satellite or cable broadcast system. Further, the methods and systems outlined herein may also be employed to provide scrambled content in Internet Protocol (IP) packets to a receiver using broadcasting, multicasting or point-to-point transmission techniques.

The ESG system 112 may generate ESG information 146 supporting a CA receiver in storing and playing back content under the DRM system. The ESG information may contain descriptive information about events such as broadcast, multimedia services and/or content that are accessible via the CA system and information indicating whether the events are recordable or not.

The ESG information may further contain DVR meta-data for supporting the creation of recorded media files protected by a DRM system. Such media file may have the DRM Content Format (DFC) as defined by OMA. Alternatively or in addition, other suitable formats for use with different DRM systems may also be used. The DVR meta-data may include a DVR content identifier (ID) and a DRM location identifier for locating a DRM server. In one embodiment the DRM location identifier may have the form of an URL. The ESG information is time-synchronized with the content in the transport stream and sent to the CA receiver over the broadcast network.

Alternatively, instead of transmitting the DRM location identifier in the ESG information to the CA receiver, it may also be part of the DVR information inserted by the CA system controller in the ECM. In that case, in order to reduce the ECM processing load in the secure device of the CA receiver, instead of signalling a URL (which may contain up to 255 bytes) a location identifier of smaller size, e.g. an IP address or the like, may be inserted into the ECM.

The DRM server 142 is configured to associate DRM rights, e.g. in the form of an object right, to a recordable or recorded broadcast event. The DRM server may communicate with a DRM agent 140 located in or connected to the CA receiver 104. The DRM agent manages the events stored and consumed by the CA receiver under the DRM system, including the acquisition and evaluation of the digital rights associated with recordable or recorded broadcast events. Using the DRM location information sent in the ESG information to the CA receiver, the DRM agent may connect to the DRM server over the bi-directional network 107, in order to request information from the DRM server and/or the CA system allowing the DRM agent to store recordable events and/or consume broadcast events stored in media files on a storage medium in the CA receiver 138.

For example, the DRM agent may request one or more rights objects associated with a recordable or recorded broadcast event selected by the user and identified by a DVR content identifier. Each right object may be associated with a usage rule, e.g. unlimited play back but no forwarding from the CA device to another media player or playing the recorded content for a particular period. The right objects may be stored in the secure environment of the DRM client or the secure device. Further, the DRM agent may request a DRM decryption key for decrypting a DRM-protected event. To that end, the DRM server may comprise an interface 120 with the CA control system so that the DRM key generated by the CA control system may be sent via the DRM server to the DRM agent.

The CA receiver 104 is configured for receiving the transport stream comprising the streams of scrambled packets and enhanced ECMs via a network interface comprising a tuner/demodulator (not shown). A CA agent 122 in the CA receiver manages the conditional access events in the CA receiver, in particular the communication between the head-end and a secure device 124 (e.g. a removable smart card, a (U)SIM or a tamper-resistant module providing the functionality of the smart card) for decrypting the ECMs using one or more secret keys.

The CA receiver further comprises an ESG client 152 configured for receiving the ESG information 146 from the ESG system 112. In one embodiment, the ESG information may be sent over the broadcast network 106, e.g. in the broadcast stream, to the CA receiver. Alternatively, in another embodiment (not shown), the ESG information may be sent over an interactive network in an out-of-band signal to the CA receiver.

The CA receiver may comprise a filter to filter out TS packets belonging to a broadcast service selected by the user. The filtered TS packets, including the enhanced ECMs associated with the selected service, are routed to the secure device 124, which comprises a processor 126 for decrypting the information contained in the ECMs (i.e. one or more CWs, the access information and—if the service selected by the user is a recordable service—the DVR information) using a private key stored in a memory 128.

If a recordable service is selected by the user, the secure device may check on the basis of the DVR information, in particular the DVR subscription information, in the enhanced ECM whether the user is allowed to record the service. If this is the case, the secure device may generate a DRM key using the DVR key in the DVR key information in the enhanced ECM. The DRM key is generated using an algorithm common to the secure device and the CA control system and allows encryption and decryption of broadcast events under the DRM system. Provided that the user is entitled to access and store content in the broadcast stream, the secure device 124 may send the CWs and, if requested by the CA agent, the DRM key and the DVR meta-data to the CA agent 122 for further processing.

The CA agent may send the CWs 156 to the CA descrambler 130 for generating clear content 158 which may be displayed to the user using a media player 136. Alternatively or in addition, if the user has indicated that the selected broadcast event should be recorded, the clear content 162 may be re-encrypted by a DRM scrambler 132 into DRM-encrypted data 166 using the DRM key 160 sent by the CA agent to the DRM scrambler. Further, the CA agent may use the DVR meta-data to create a file entry, e.g. a DFC file entry, in the storage medium 138 of the CA receiver. This file entry is used by the DRM system for storing events encrypted by the DRM scrambler using the DRM key. The file entry may comprise information for retrieving a DRM key for decrypting the stored content. This information may comprise the location identifier (URL) of the DRM server, a so-called DRM content identifier for identifying the content decrypted under the DRM encryption key and the DVR key index in the DVR key information which provides a reference to the DVR key stored in the secure database connected to the CA control system. Thus, only the DVR key index is stored with the DRM-protected media file. The key information required for generating a DRM key (i.e. the DVR key) is stored in the secure environment of the CA control system. Such key scheme thus ensures that all sensitive key information is stored and/or generated either in the secure environment of the CA control system or the secure device of the CA receiver.

The DRM content identifier is determined on the basis of the DVR content identifier associated with the recorded content, for example the DVR content identifier combined with the serial number of the secure device, e.g. the smart card. The DRM content identifier thus represents a unique identifier for each recording of a broadcast event that uses a different DRM key and that is stored in the CA receiver.

The CA receiver may comprise a DVR client 154 configured for allowing the user to use the ESG for browsing through the recorded events and for selecting recordable content for playback. The DVR client may trigger the DRM agent using a triggers signal 182 when it receives an input signal 150 from a user. The trigger signal may trigger the DRM agent to interact with the DRM server of the bi-directional network in order to request a DRM key and/or one or more object rights associated with the selected stored broadcast event. To that end, the DRM agent may be configured to use the information in the file entry of a selected media file, i.e. the location information of the DRM server, the DVR content identifier or a hash thereof, and the DVR key index, in order to send a request for a DRM key and/or a rights object to the DRM server.

If a DRM key for decrypting the one or more events is required, the DRM server may forward the request to the CA control system, which uses the DVR content identifier and the DVR key index in the request in order to retrieve the associated DVR key stored in the secure key database 174 and to generate a DRM key. Further, if a right object associated with a recorded event identified in the request is required, the DRM server may be issue such a rights object in accordance with the rights information provided by the BIS 116 to the DRM server.

The DRM server may be configured to send the DRM key and/or the issued right object in a DRM response message 180 over the interactive network back to the DRM agent 140 of the CA receiver. The DRM agent may forward the DRM key 170 to the DRM descrambler in order to decrypt the recorded DRM-protected content and to provide clear content 164 to a media player 136.

Hence, in the system according to the invention the generation of a DRM key for decrypting a broadcast event is triggered by the DRM system and takes place within the secure environment of the CA control system. Similarly, the generation of the DRM key for encrypting a broadcast event is triggered by the CA agent and takes place within the secure environment of the secure device. Further, the scheme may be implemented using multiple DRM systems, wherein the DVR meta-data sent by the ESG system to the ESG client in the CA receiver comprises the location information, e.g. URLs or IP addresses, of the DRM system associated with a DVR content ID.

Hereafter, the process of generating and using enhanced ECMs, the process of transcoding CA protected data to DRM protected data, the process of associating right objects to recorded events and the consumption of such recorded events will be described in further detail with reference to FIG. 2-4.

Figure 2:
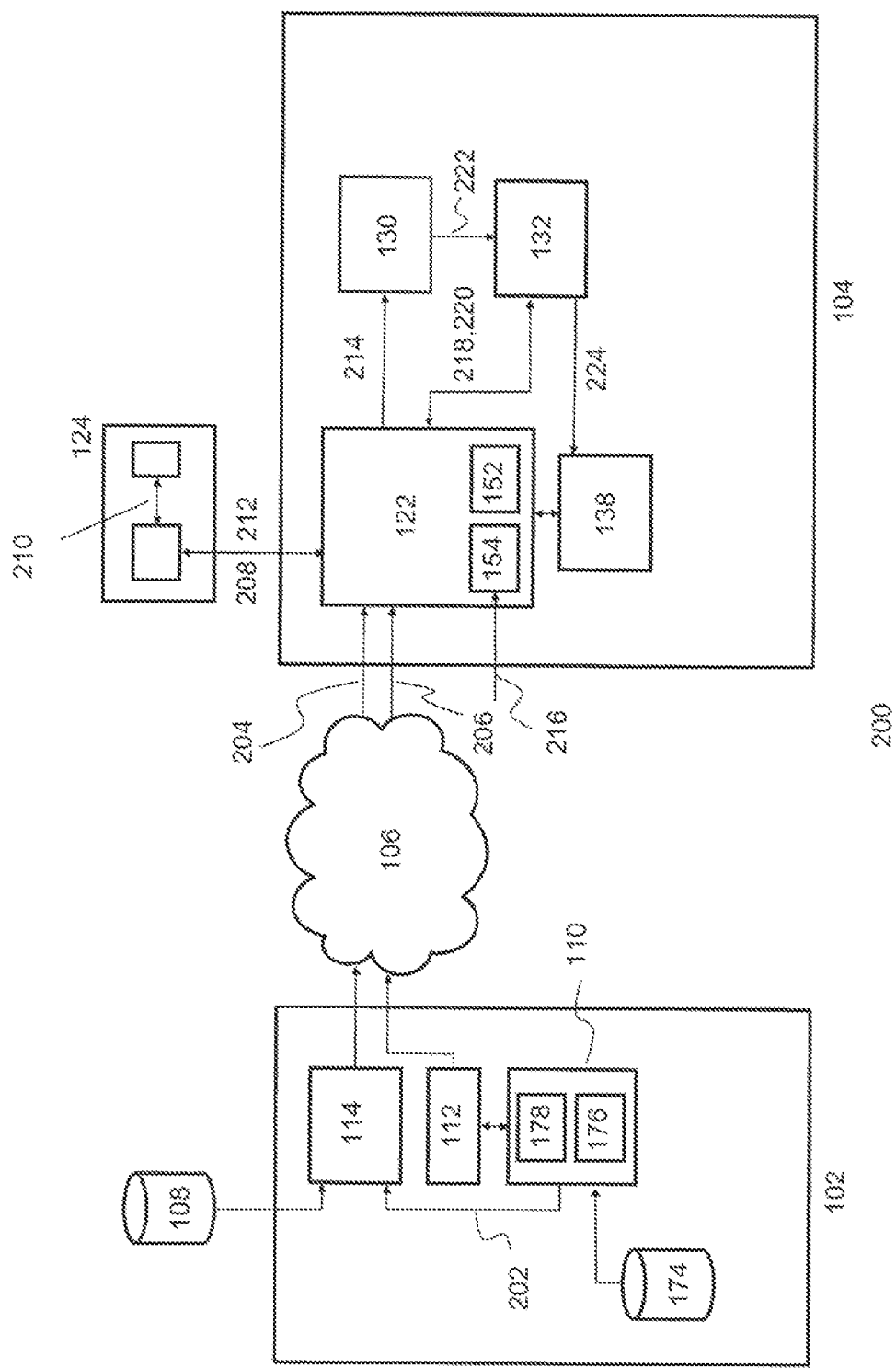
FIG. 2 depicts a schematic of a process of the invention of broadcasting and recording content according to one embodiment.

FIG. 2 depicts a schematic representation 200 of a process of broadcasting and recording content in a system as depicted in FIG. 1, wherein the recording is triggered by the ESG. In particular, FIG. 2 illustrates the recording of broadcast events, including the descrambling, reformatting, re-scrambling and storage thereof. Elements in the broadcasting system not participating in this process are not depicted in FIG. 2. In this embodiment, the CA receiver may comprise a DVR client which is configured to allow the user to mark events for recording if they are indicated as recordable.

In a first step 202 of the process, a CW for encrypting the content in the broadcast stream for a predetermined time, the so-called crypto-period (CP), and an enhanced ECM associated with the packets scrambled during the crypto-period are sent to the CA scrambler. The enhanced ECM may comprise one or more encrypted CWs, CA access information using the normal ECM formatting rules as described in the DVB Simulcrypt protocol and the DVR information as discussed with reference to FIG. 1.

The scrambled content and the associated enhanced ECMs are subsequently encapsulated in IP packets, multiplexed into a transport stream and broadcast over a broadcast network, e.g. a DVB-H network, to the CA agent in the CA receiver (step 204). Further, the ESG system may transmit ESG information over the broadcast network to the CA agent (step 206). The ESG information may be transmitted to the CA receiver in synchronization with the broadcast stream.

The ESG client in the CA receiver may display information to the user indicating the events that may be recorded. If an event is selected, the CA agent tunes into the channel associated with the event, selects the associated enhanced ECMs associated with the channel and forwards the selected ECMs to a secure device for further processing (step 208).

The secure device then verifies whether the ECM is valid and, if so, extracts the relevant CWs using the secret product key stored in the secure device (step 210). Then, if the header information of the ECM indicates that the event is recordable, the CA agent determines whether the CA receiver is authorized to record content that is marked as recordable. In one embodiment, the CA agent may check whether the CA receiver is authorized to record an event by comparing the DVR subscription information in the DVR information with the object rights stored in the memory of the secure device or the CA agent. If is determined that the CA device has an appropriate right object for recording an event under the DVR subscription, the CA receiver is authorized. The secure device then stores the DVR information in its memory and transmits the DVR key information to the CA agent upon request of the CA agent.

The secure device returns the CWs to the CA agent (step 212). The CA agent forwards the CWs to CA descrambler (step 214) and determines whether the recording function is active. If the recording functionality is not activated, the CA descrambler decrypts the broadcast content and forwards the clear content to the media player for consumption (not shown).

The recording functionality in the CA receiver may be activated by the DVR client by sending a trigger signal to the CA agent to start a recording of a broadcast event (step 216). The trigger signal may include identification information of the recorded event such as the DVR Content ID and location information of the DRM server, e.g. an URL. The CA agent may process the trigger signal from the DVR client and may subsequently trigger the DRM scrambler to initiate a new recording session. Further, the DVR client or the CA agent may pass DVR meta-data to the DRM scrambler allowing it to manage the reformatting of the content and the creation of the DCF file in which the re-encrypted content will be stored (step 218).

Further, the CA agent may compare the DVR content ID (or a hash thereof) received back from the secure device with the MD5 hash value calculated from the DVR content ID that it received from the DVR Client. If there is a match, then the CA agent may request the DVR encryption key from the secure device, generates a DRM key and forwards the DRM key to the DRM Scrambler along with the other required DVR parameters (step 220). Hence, the DRM key will be provided by the secure device to the CA receiver after having determined that the event is recordable, that the CA receiver has the correct subscription and/or right object and that the content ID matches the content ID received from the DVR client.

The clear content may then be forwarded from the CA descrambler to the DRM Scrambler (step 222), where it is re-scrambled under the DRM key, reformatted, and stored in the DCF file (step 224) in the storage medium 138. The clear content may also be forwarded from the CA descrambler to the player, as the user may be viewing the content at the same time as the recording (not shown). The file entry of the stored media file comprises the location identifier (URL) of the DRM server, an identifying the content decrypted under the DRM encryption key and a reference to the DVR key stored in the secure database connected to the CA control system. Thus, the DRM-protected media file only comprises references to location for finding key information. The key information required for generating a DRM key (i.e. the DVR key) is stored in the secure environment of the CA control system.

Steps 220-224 may be repeated for every crypto-period, i.e. the period in which a particular CW is valid, until the Content ID hash returned from the secure device no longer matches the Content ID hash for the current recording session, or until no Content ID hash is returned from the secure device. The DRM Scrambler thereafter finalizes the DCF media file and notifies the CA agent and the DVR client that the recording session was successfully completed. The The recorded content may be stored as a protected OMA DRM 2.0 DCF file on the selected storage medium. The user may use either an existing rights object or acquire a new rights object from the DRM server to access the DCF file.

It is appreciated that the invention is not limited to the process as described with reference to FIG. 2. In a variant (not shown), the recording session may be triggered by the user from within the channel. In that case the user may trigger the recording at some random point within one or more recordable events. The user-initiated recording results in the DVR client triggering the CA agent to start a recording and providing the appropriate DVR meta-data to the DRM scrambler. The trigger from the DVR client may also indicate that it is a user-initiated recording. The recording may continue until the user decides to stop recording, or until an error condition terminates the recording. The DVR client notifies the CA agent when the user terminates the recording, and at the same time notifies the DRM scrambler that the current recording session should be terminated. If the CA agent is triggered to stop de recording, the DRM scrambler finalizes the DCF file and the CA device agent is notified that the recording session for the current event was successfully completed.

The CA agent then evaluates whether the user has selected further recording of a recordable event. If not, it retrieves the appropriate meta-data from the DVR Client and continues with the initiation of a new recording session and the creation of a new DCF file for the next event.

Figure 3:
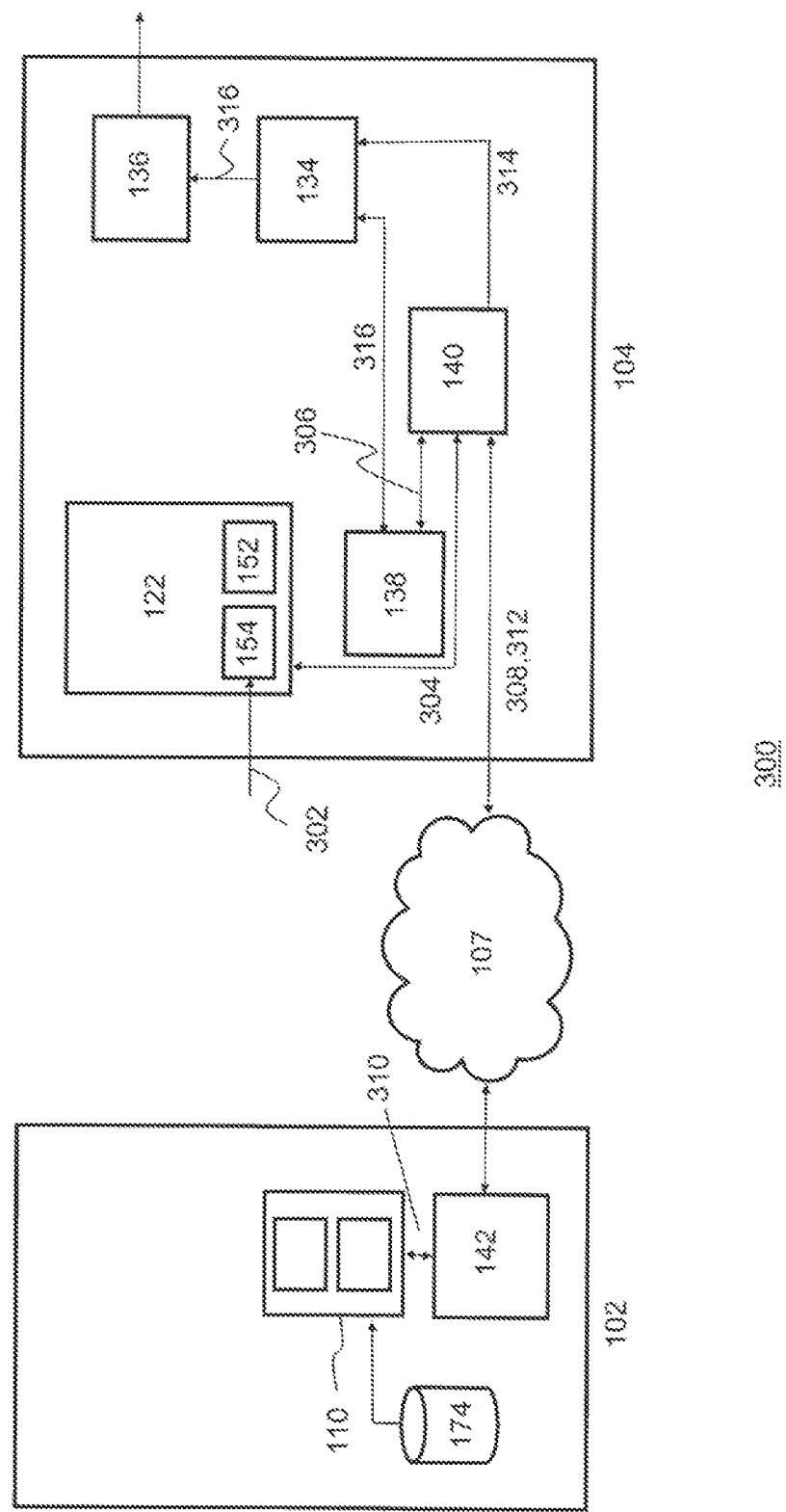
FIG. 3 depicts a schematic of a process according to one embodiment of the invention wherein the content that was previously recorded is consumed.

FIG. 3 depicts a schematic representation 300 of a process wherein the content that was previously recorded and stored event is consumed. Optionally, the process may include the acquisition of appropriate rights to access the events stored under the DRM system. Elements in the broadcasting system not participating in this process are not depicted in FIG. 2.

In this embodiment the CA receiver on which the content is being played back may either already have a valid rights object, or may have the appropriate connectivity, e.g. to a DRM server, to acquire a rights object. Further, the CA receiver may have an appropriate application, e.g. included in the DRM agent or a separate media manager, that will allow the user to browse through the recorded or acquired DRM-protected content and to select the content that should be played back. In this embodiment, it is assumed that the device hosting the DRM agent has been previously registered with DRM server using an appropriate registration protocol.

The process in FIG. 3 starts by the user requesting, e.g. through the DVR client, the consumption of a recorded event (step 302). In response, the CA agent sends a trigger to the DRM agent for evaluating the associated DCF file in the storage medium 138 of the CA receiver and for determining whether an appropriate and valid rights object is present on the device (step 304).

If no suitable rights object is present, the DRM agent parses the DVR meta-data in the DCF file to determine the URL of the DRM sever where it can acquire the rights (step 306). Thereafter, the DRM Agent initiates a web request, e.g. an HTTP GET to the URL of the DRM server (step 308). The request may include a DVR content ID, the DVR key index and a receiver identifier, e.g. the unique serial number of the secure device. Further, the DRM server may interact with the user of the device to allow the selection of options, to obtain acceptance to proceed, or for other purposes.

The DRM server extracts the query string from the URL sent by the DRM agent and submits this data to CA control system (step 310), which evaluates these data, looks up the required parameters from the secure key database, and generates the appropriate DRM key.

If any part of the lookup by the CA control system fails, it notifies the DRM server which sends in response an appropriate error message to the DRM Agent. Otherwise, if the DRM key has been successfully retrieved, the DRM server may verify the transaction by preparing an appropriate rights object for the requesting DRM agent. This rights object and the DRM decryption key is sent in a DRM response message to the requesting DRM agent (step 312).

The DRM Agent evaluates the rights object associated with the requested DCF file and determines whether it is valid and whether the expressed rights are sufficient to allow access to the content. If the rights object is invalid, or if the rights are insufficient, the DRM agent notifies the user and the process is terminated.

If the rights objects are valid, the DRM agent authorizes consumption of the recorded event, extracts the DRM key from DRM response message and forwards the DRM key and the DVR content ID to the DRM descrambler (step 314). Using the DVR content ID and the DRM description key, the DRM descrambler retrieves the encrypted event stored in the storage medium (step 316), decrypts it, and forwards the clear content to the media player for consumption (step 318). In another variant, the rights objects may be sent to the device prior to the recording of an event.

In is to be understood that the invention is not limited to the embodiments described with reference to FIG. 1-3. For example, instead of a DRM-enabled CA receiver as illustrated in FIG. 1 a CA receiver system may be used. The CA receiver system may comprise a DRM-enabled CA receiver configured for processing the enhanced ECMs and for storing DRM-protected events and a separate DRM-enabled media player configured for interfacing with the CA receiver, for receiving DRM-protected events from the CA receiver, for contacting a DRM server and consuming said events. FIG. 4 illustrates one example of such CA receiver system 400, comprising a CA receiver 402 and a separate DRM-enabled media player 404, preferably a portable media player. Such portable media player may be dedicated device or, alternatively, may be an application on mobile phone, a PDA or a personal computer.

The CA receiver comprises a CA agent 406 connected to a secure device 408, a CA descrambler 410, a DRM descrambler 412 and a storage medium 414. The DRM-enabled media player 404 may comprise a DRM agent 416, a DRM descrambler 418, a storage medium 420, a media player 422 and interfaces 424,426, preferably wireless, for connecting to a DRM server and the CA receiver respectively. In this configuration, the CA receiver receives and stores recordable events, e.g. using a process as described with reference to FIG. 2. The CA-agent in the CA receiver may be configured to allow the media player to be registered with the CA receiver. Further, the DRM-enabled media player may be configured to retrieve DRM-encrypted events stored in the CA receiver, to retrieve a DRM decryption key and, optionally, a right object associated with the recorded event and to consume events retrieved from the CA receiver. In one embodiment, the CA receiver may be configured to register a number of DRM-enabled media players.

Figure 4:
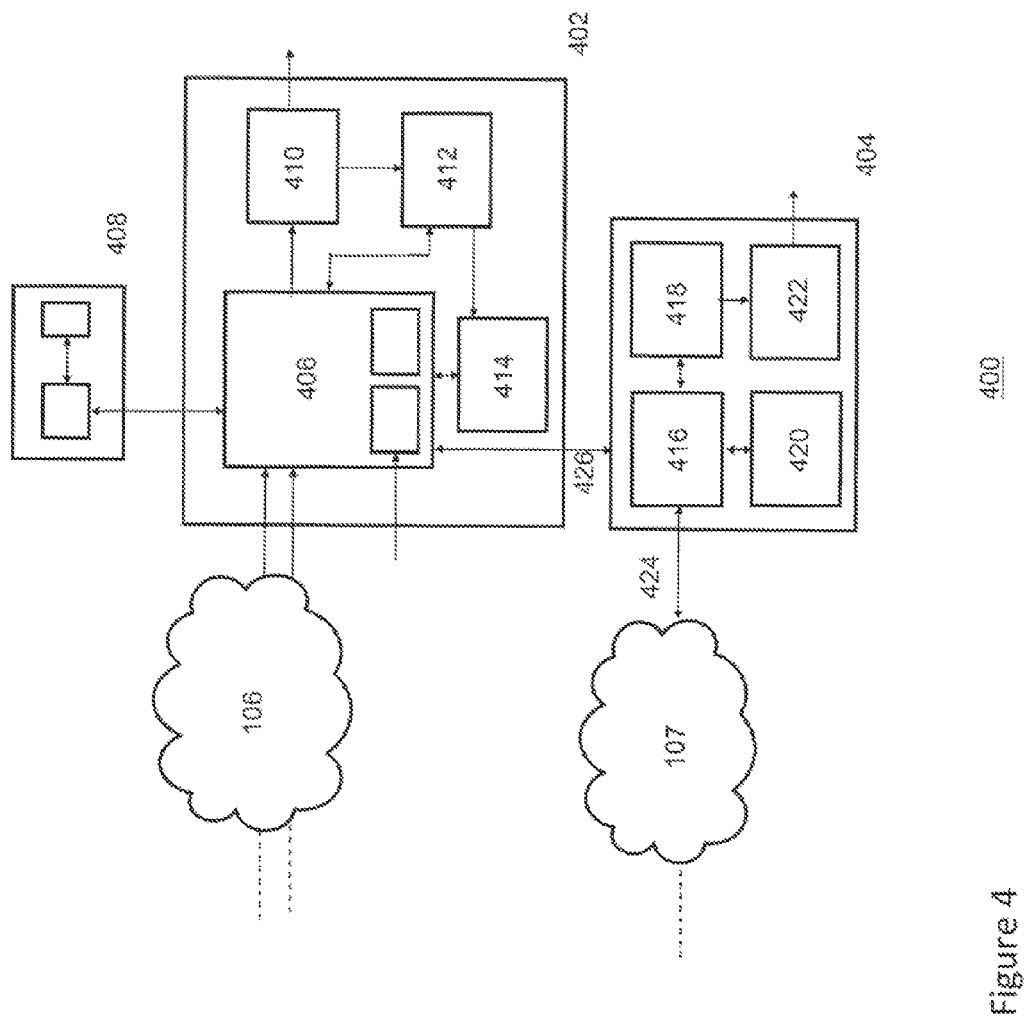
FIG. 4 depicts a schematic representation of a CA receiver system according to an embodiment of the invention.

It will be understood that the location of the functional elements in the CA receiver system as depicted in FIG. 4 may vary without departing from the invention. For example in one embodiment all communication with the DRM server may be managed by the CA receiver. To that end, the DRM agent communicating with the DRM server is located in the CA agent. Further, the CA system as depicted in FIG. 1 may comprise several DRM servers. Alternatively or in addition, the CA system may be connected to one or more third-party DRM system comprising different DRM schemes.

Further embodiments are herein described in the following items:

Item A: a method of transmitting recordable content protected in accordance with a conditional access system to a receiver, said receiver being configured for storing and consuming content in said stream in accordance with a digital rights management system, the method comprising the steps of: providing at least one recordable event for transmission in a content stream to said receiver; generating recording information associated with said recordable event, said recording information comprising at least a recording identifier enabling said receiver to identify recordable data packets associated with said recordable event; generating one or more entitlement control messages associated with said recordable event, said entitlement control messages comprising said recording information and one or more first keys for decrypting data in said content stream; and, transmitting said content stream and said one or more entitlement control messages to said receiver.

Method according to item A, wherein said recording information further comprises at least one content identifier for identifying content in said recordable event.

Method according to item A or according to the paragraph above referring to item A, wherein said recording information further comprises second key information associated with said digital rights management system for enabling the receiver to generate at least one DRM key for storing at least part of said recordable event in accordance with said digital rights management system.

Method according to item A, wherein said second key information comprises a second key for generating a DRM key and a key index for identifying said second key when stored in a secure database associated with said conditional access system.

Method according to item A or according to any of the paragraphs above referring to item A, the method further comprising the step of: generating location information for locating at least one server associated with said digital rights management system; sending said location information in said steam and/or in at least one of said entitlement control messages to said receiver.

Method according to item A or according to any of the paragraphs above referring to item A, wherein said content stream is generated by a head-end system, said head-end system comprising an interface with a digital rights management server associated with said digital rights management system.

Item B: content encryption system for transmitting a content stream protected in accordance with a conditional access system to a receiver, wherein said receiver is configured for storing and consuming at least one recordable event in said content stream in accordance with a digital rights management system, said content encryption system comprising: a first key generator for generating at least one first key; a scrambler for generating an encrypted content stream using said first key; a service information system for identifying at least one recordable event in said content stream and for generating at least one recording identifier associated with said recordable event enabling said receiver to determine data packets in said content stream to be recordable; an entitlement control message generator for generating entitlement control messages comprising at least one first key and one recording identifier; a transmitter for transmitting said content stream and said one or more entitlement control messages to said receiver.

Content encryption system according to item B, wherein said service information system is further configured to generate at least one content identifier for identifying content in said recordable event, said content identifier being inserted by said entitlement control message generator in at least one of said entitlement control messages.

Content encryption system according to item B or according to the paragraph above referring to item B, said system further comprising a second key generator for generating second key information associated with said digital rights management system, said second key information enabling said receiver to encrypt and store said recordable event on a storage medium and to subsequently decrypt said recorded event for consumption, said second key information being inserted by said entitlement control message generator in at least one of said entitlement control messages.

Content encryption system according to item B or according to any of the paragraphs above referring to item B, wherein said service information system is further configured to generate a location identifier for locating at least one server in said digital rights management system, said location identifier being inserted by said entitlement control message generator in said entitlement control message or said location identifier being inserted by said scrambler in said content stream.

Content encryption system according to item B or according to any of the paragraphs above referring to item B, said system further comprising: a database for storing a second key in said second key information, said second key enabling said conditional access system to generate a DRM key for decrypting a recorded event.

Content encryption system according to item B or according to any of the paragraphs above referring to item B, said system further comprising: a controller for controlling the transmission of said content stream and said associated entitlement control messages, said controller further comprising a DRM key generator for generating a DRM key, said DRM key being used by said receiver to decrypted an event stored in accordance with said digital rights management system.

Content encryption system according to item B or according to any of the paragraphs above referring to item B, said system further comprising: a server associated with said digital rights management system, said server comprising an interface for communicating with said controller and an interface for communicating with said receiver.

Item C: service information system, preferably an electronic service guide system, for use in a content encryption system according to item B or any content encryption system as defined in the above paragraphs referring to item B, said system comprising: a content manager for identifying one or more recordable events in a content stream and for generating at least one content identifier for identifying content in said recordable events; and, a location information manager for generating location information of at least one server associated with said digital rights management system.

Item D: a digital rights management server system for use in a content encryption system according to item B or any content encryption system as defined in the above paragraphs referring to item B, said server system comprising: an input for receiving a request for a DRM key and/or a rights object from a receiver, said request comprising at least a content identifier associated with an event stored on a storage medium of said receiver, a receiver identifier for identification of said receiver and a key reference; a rights issuer for evaluating whether said receiver identified in said request is entitled to a rights object associated with said stored content and for assigning at least one right object to said receiver if said receiver is entitled; an interface with a conditional access system, wherein said server is configured for sending said key reference via said interface to said conditional access system, said key reference enabling said condition access system to retrieve a second key stored in a database and to generate a DRM key using said second key.

Item E: a data structure generated by a content encryption system according to item B or any content encryption system as defined in the above paragraphs referring to item B, said data packet comprising at least a first key for decrypting at least part of said content stream, a second key for enabling a receiver receiving said data packet to generate at least DRM key for storing recordable events in said broadcast stream into a media file protected under a digital rights management system and at least one content identifier for identifying content in said recordable events.

Item F: a computer program product comprising software code portions configured for, when run in the memory of a computer, executing the method steps according to item A or to the method steps as defined in the above paragraphs referring to item A.

It is to be understood that any feature described in relation to any one embodiment, including the embodiments described with reference to items A-F, may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of transforming recordable content protected in accordance with a conditional access system into content protected in accordance with a digital rights management system, the method comprising:
   receiving a content stream and one or more entitlement control messages associated with said content stream, at least one of said entitlement control messages comprising at least one first key for decrypting data in said content stream and recording information comprising first information indicating one or more events in said content stream to be recordable and second information for locating a server associated with the digital rights management system;
   selecting at least one recordable event;
   decrypting data packets associated with said selected event using said first key;
   providing a DRM key for encryption associated with said digital rights management system;
   encrypting at least part of said data packets under said DRM key; and
   generating and transmitting, to the server, a request for accessing and/or consuming the encrypted data packet stored on a storage medium, using the recording information in the at least one of the entitlement control messages.

2. The method according to claim 1, wherein said one or more entitlement control messages further comprise at least one content identifier for identifying content in said recordable event and/or second key information associated with said digital rights management system, said second key information comprising a second key enabling said receiver to generate said DRM key for encryption.

3. The method according to claim 1, wherein the recording information comprises a key reference used by said conditional access system to retrieve a second key for generating a DRM key for decryption from a database associated with the conditional access system, the conditional access system generating said DRM key for decryption based on the second key in response to the receiver's request having the key reference for decryption of said encrypted recordable event.

4. The method according to claim 1, the method further comprising:
   storing said data packets encrypted in accordance with said digital rights management system and said associated recording information on storage medium.

5. A method of decrypting of at least part of a recorded event associated with a content stream originating from a conditional access system, the method comprising:
   receiving, from the conditional access system, one or more entitlement control messages comprising recording information, the recoding information comprising event information for one or more events in a content stream and location information for locating a server associated with a digital rights management system, the digital rights management system comprising an interface with the conditional access system;
   selecting at least one event of the one or more events, stored on a storage medium;
   generating and transmitting, to the server, a request for accessing and/or consuming the at least one event stored on the storage medium, using the recording information, the request comprising at least one content identifier for identifying said stored event and a key reference for enabling said conditional access system to generate the DRM key for decrypting,
   receiving DRM key for decryption generated by said conditional access system; and
   decrypting said stored event for consumption using said DRM key for decryption.

6. A receiver system for receiving recordable content in a content stream protected in accordance with a conditional access system and for transforming said content into content protected in accordance with a digital rights management system, the receiver system comprising:
   a computer processor for:
      receiving said content stream and one or more associated entitlement control messages, at least one of said entitlement control messages comprising a first key and recording information comprising recording identifier and location information for locating a server associated with the digital rights management system;
      detecting the recording identifier in said recording information, said recording identifier indicating that one or more events in said broadcast stream are recordable;
      selecting at least one of said recordable events identified by said recording detector, data packets associated with the selected recordable event being decrypted using said first key;
      providing a DRM key for encryption to a DRM scrambler for encrypting a data packet associated with the selected recordable event under said DRM key; and
      generating and transmitting, to the server, a request for accessing and/or consuming the encrypted data packet stored on a storage medium, using the recording information in the at least one of the entitlement control messages.

7. The receiver system according to claim 6, wherein the recording information comprises at least one content identifier for identifying content in said recordable events and/or second key information, said second key information comprising a second key enabling the processor to generate said DRM key for encryption.

8. The receiver system according to claim 6, wherein the processor configured for:
   managing the decryption of said entitlement control messages and said content stream in accordance with said conditional access system, and
   managing storage of said data packets encrypted by said DRM scrambler in a media file on the storage medium, said media file being stored in accordance with said digital rights management system.

9. The receiver system according to claim 8, wherein the processor is further configured for:
   storing a content identifier and the location information in said media file, said content identifier identifying the content in said media file, and/or enabling a user to select the event, and in response to said selection sending the request for a DRM key for decryption and/or an object right associated to said selected event to the server.

10. The receiver system according to claim 7, wherein the processor is configured to receive and/or request at least one or more DRM keys and/or an object right from the associated with the digital rights management system server associated with said digital rights management system.

11. The receiver system according to claim 6, wherein the processor is configured to:
request at least one or more DRM keys and/or object rights from the server associated with said digital rights management system, said request comprising at least a receiver identifier, the content identifier and the location information for locating said server, and
receive the at least one or more DRM keys generated by said conditional access system and/or one or more object rights issued by said server.

12. The receiver system according to claim 6, comprising:
a conditional access descrambler for decrypting the at least one data packet in the stream using the first key; and/or the DRM scrambler.

13. The receiver system according to claim 6, comprising data structure in a memory, said data structure comprising:
one or more data packets encrypted under the DRM key for encryption and associated with the digital rights management system, and
the location information and a key reference enabling the receiver system accessing said data structure to locate the server in said digital rights management system and to request said conditional access system via said server to generate a DRM key for decryption, wherein the key reference refers to a second key in a database, said second key allowing said conditional access system to generate said DRM key for decryption.

14. A non-transitory computer program product comprising software code portions configured for, when run in the memory of a computer, executing the method according to claim 1.

15. The method according to claim 1, the method comprising:
recording subscription information for checking entitlement to store at least one of said recordable events.

16. The method according to claim 4, wherein storing said data packets comprises:
storing said data packets encrypted in accordance with said digital rights management system and said associated recording information on the storage medium in a media file associated with said digital rights management system.

* * * * *